United States Patent [19]

Messing

[11] Patent Number: 4,936,996
[45] Date of Patent: Jun. 26, 1990

[54] METHOD OF PROCESSING BIODEGRADABLE ORGANIC MATERIAL

[75] Inventor: Ralph A. Messing, Horseheads, N.Y.

[73] Assignee: Biodynamic Systems Inc., Horseheads, N.Y.

[21] Appl. No.: 418,269

[22] Filed: Oct. 6, 1989

Related U.S. Application Data

[63] Continuation of Ser. No. 543,338, Oct. 19, 1983, abandoned.

[51] Int. Cl.$^5$ .............................................. C02F 3/30
[52] U.S. Cl. .................................. 210/603; 210/611; 210/615; 210/621; 435/267; 435/801
[58] Field of Search ................ 210/603, 612, 615–618, 210/621, 622, 610, 611, 614, 742, 743, 630, 150, 151; 435/176, 267, 288, 801

[56] References Cited

U.S. PATENT DOCUMENTS

| | | | |
|---|---|---|---|
| 4,067,801 | 1/1978 | Ishida et al. | 210/603 |
| 4,153,510 | 5/1979 | Messing et al. | 195/59 |
| 4,256,573 | 3/1981 | Shimodaira et al. | 210/618 |
| 4,321,141 | 3/1982 | Messing | 210/603 |

OTHER PUBLICATIONS

Nester, *Microbiology*, Rinehart and Winston, Inc. (1973), p. 256.

Messing et al., "Rapid Production of Methane with Immobilized Microbes," *Annals of the New York Academy of Sciences* (1983), pp. 501–513.

*Primary Examiner*—Tom Wyse
*Attorney, Agent, or Firm*—Ralph R. Barnard

[57] ABSTRACT

An improved method and apparatus for treating a biodegradable organic material in an aqueous medium to produce methane gas is disclosed. The method involves flowing the aqueous medium under pressure through a hydrolytic-redox, immobilized microbe bioreactor to form a reaction product and then continuing the flow of the reaction product through an anaerobic, immobilized microbe bioreactor whereby methane gas is evolved. The aqueous medium is flowed in a downward direction counter to the flow of the gaseous carbon dioxide given off during the reaction and the aqueous medium may be recycled.

17 Claims, 1 Drawing Sheet

METHOD OF PROCESSING BIODEGRADABLE ORGANIC MATERIAL

This is a continuation of Ser. No. 543,338, filed 10/19/83, now abandoned.

BACKGROUND OF THE INVENTION

1. Field of the Invention

This invention relates to organic waste processing and more particularly to an method of processing biodegradable organic waste in an aqueous medium. It also relates to an improved method, using microbes immobilized on a porous organic support, for processing such organic biodegradable waste.

2. Description of the Prior Art

Numerous methods have been used for organic waste disposal and pollution control. Disposing of organic waste, as for example, by burial, land-fill, dumping at sea, and the like, have created havoc with the environment and cleaning up the resultant toxic contamination has been very expensive.

Other waste disposal methods include biological aerobic or anaerobic fermentation, thermophilic digestion, destructive distillation and incineration. In some instances, these methods may convert the organic waste to a source of energy and even to useful products. Thus W. J. Jewell et al., disclosed the use of anaerobic fermentation with the production of fuel in "Methane Generation from Agricultural Wastes: Review of Concept and Future Applications", Paper No. NA74-107, presented at the 1974 Northeast Regional Meeting of the American Society of Agricultural Engineers, West Virginia University, Morgantown, W.V., Aug. 18–21, 1974. One of the most promising of the processes, mentioned hereinabove is biological anaerobic fermentation which has received considerable attention in recent years and is discussed by R. A. Messing in Biotechnology and Bioengineering, XXIV, 1115–1123 (1982) and in Genetic Engineering News, 2(#3), pp 8–9 (May/June) 1982.

Current interest in biological anaerobic fermentation appears to be due, at least in part, to the development of the anaerobic filter. This is disclosed by J. C. Young et al., Jour. Water Poll. Control Fed., 41, R160 (1969); P. L. McCarty, "Anaerobic Processes", a paper presented at the Birmingham Short Course on Design Aspects of Biological Treatment, International Association of Water Pollution Research, Birmingham, England, Sept. 18, 1974; and J. C. Jennett et al., Jour. Water Poll. Control Fed., 47, 104 (1975). The anaerobic filter is essentially a vertical column or tank usually containing rocks and having a film of microbes on the outer surface of the rocks. In the anaerobic filter, however, the waste is fed from the bottom of the column through the filter. Thus, the flow of waste is in an upward direction through the bed of rocks so that the bed is completely submerged. Anaerobic microorganisms accumulate in the void spaces between the rocks and provide a large, active biological mass. J. C. Young et al., supra at R150, suggests that the effluent is essentially free of biological solids.

Further improvements in the use of immobilized microbes are taught by R. A. Messing in U.S. Pat. No. 4,321,141, which discloses a method of processing biodegradable waste in an aqueous medium by serially passing an organic waste-containing aqueous medium, under pressure through a first, hydrolytic-redox bioreactor and then through a second, anaerobic bioreactor. Each bioreactor contains microbes immobilized on an inorganic support. Both the first and second bioreactors of the processing method contain a porous inorganic support which is suitable for accumulation of a biomass. Carbon dioxide is produced as a by-product in the first bioreactor and it is known that an excess of carbon dioxide inhibits the metabolism and reproduction of the acid-forming microbes which are that first reactor. The aqueous medium is fed from the bottom of the first bioreactor and is forced under pressure to flow in an upward direction and the carbon dioxide evolved naturally bubbles in the same direction. Unfortunately, using the apparatus as taught by U.S. Pat. No. 4,321,141, the excess carbon dioxide can not selectively be removed.

SUMMARY OF THE INVENTION

In accordance with the present invention, I have discovered an improved method of treating a biodegradable organic material in a substantially aqueous medium. The method involved initially passing the aqueous medium, in a downward direction, through a first immobilized bioreactor having an upper portion and a lower portion. The first bioreactor contains a microbe phase, capable of hydrolyzing and oxidizing the organic material, and a porous support on which the microbe phase is immobilized. The organic material is acted on by the immobilized microbes to form a first reaction product and as a by-product of the reaction gaseous carbon dioxide is evolved. The first reaction product is then passed, in a downward direction, through a second immobilized bioreactor which contains a second microbe phase capable of converting the first reaction product to methane. This microbe phase is also immobilized on a porous support. During the process the gaseous carbon dioxide is removed form the upper portion of the first reactor, where the accumulation of this gas is detrimental, and delivered to the second reactor, where the presence of carbon dioxide is required. Furthermore, the method involves recycling the organic material in the first bioreactor.

DETAILED DESCRIPTION OF THE INVENTION

Figure 1:
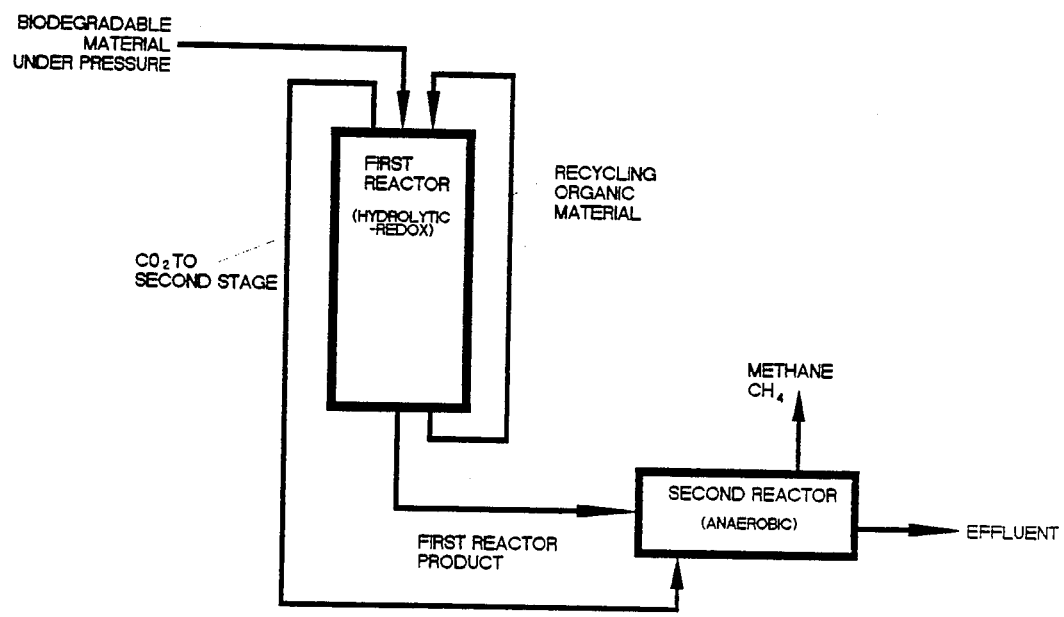

As used herein, the term "biodegradable" means only that at least some of the organic waste to be treated must be capable of being degraded by microorganisms. As a practical matter, at least 50 percent by weight of the organic waste usually will be biodegradable. It may be necessary or desirable, however, to utilize, in the processing method of the present invention waste having substantially lower levels of biodegradable organic matter.

Thus, the organic waste or the aqueous medium containing such waste can contain non-biodegradable organic matter and inorganic materials, provided that the organic waste and aqueous medium are essentially free of compounds having significant toxicity toward the microbes present in either reactor.

In general, the nature of the aqueous medium is not critical. In most instances, water will constitute at least 50 percent by weight of the aqueous medium. Preferably, water will constitute from about 80 to about 98 percent by weight of the aqueous medium.

Frequently, the waste stream to be treated by the processing method of the present invention can be used without any pretreatment. Occasionally, it may be desirable or necessary to dilute the waste stream with water, to separate from the waste stream excessive amounts of solids or excessively coarse solids which might interfere with the pumping equipment necessary to move the aqueous medium through the processing apparatus of the present invention, or to increase the pH of the aqueous medium by, for example, addition of an inorganic or organic base, such as potassium carbonate, sodium hydroxide, triethylamine, and the like. Alternatively, solid or essentially non-aqueous organic waste can be diluted with water as desired.

The term "bioreactor", as used herein, is a contraction of "biochemical reactor" and, therefore, means that the chemical transformations or conversions taking place therein are carried out by living organisms. The term "immobilized microbe bioreactor" is used to identify such living organisms as microbes which are in an immobilized state (as that term is used by those having ordinary skill in the art).

As already indicated, both the first and second bioreactors of the method of the present invention contain a porous support which is suitable for the accumulation of a biomass. In the case of the second bioreactor, the porous support optionally is contained within the confines of controlled-pore, hydrophobic organic membrane.

As a matter of convenience, the porous support in the two bioreactors will be of the same type, although such is not required. Preferably, the support in each bioreactor is a porous, high surface area, recalcitrant, dimensionally-stable material which is suitable for the accumulation of a high biomass surface within a relatively small volume. More preferably, at least 70 percent of the pores of the support will have diameters at least as large as the smallest major dimension, but less than about five times the largest major dimension, of the microbes present in the bioreactor. Most preferably, the average diameter of the pores of the support is in the range of about 0.8 to 220$\mu$.

As used herein, the expression "high surface area porous support" means a support having a surface area greater than about 0.01 m$^2$ per gram of support. In general, surface area is determined by inert gas adsorption or the B.E.T. method; see, e.g., S. J. Gregg and K. S. W. Sing, "Adsorption, Surface Area, and Porosity," Academic Press, Inc., New York, 1967. Pore diameters, on the other hand, are more readily determined by mercury intrusion porosimetry; see, e.g., N. M. Winslow and J. J. Shapiro, "An Instrument for the Measurement of Pore-Size Distribution by Mercury Penetration," ASTM Bulletin No. 236, February 1959.

The support can be inorganic or organic and in general can be siliceous or nonsiliceous metal oxides which are amorphous or crystalline, or recalcitrant organic polymers with hydrophilic surfaces. Examples of siliceous materials include, among other, glass, silica, halloysite, kaolinite, cordierite, wollastonite, bentonite and the like. Examples of nonsiliceous metal oxides include, among others, alumina, spinel, apatite, nickel oxide, titania and the like. The inorganic support also can be composed of a mixture of siliceous and nonsiliceous materials, such as alumina-cordierite. Cordierite and clay (i.e. halloysite and/or kaolinite) materials such as those employed in the examples are preferred. Examples of recalcitrant organic polymers are polyethylene, polypropylene, fluorocarbon polymers, each being modified with a hydrophilic surface layer.

For a more complete description of the inorganic support, see application Ser. No. 833,278 filed Sept. 14, 1977, in the names of Ralph A. Messing and Robert A Oppermann, now U.S. Pat. No. 4,153,510.

As already indicated, the porous support in each bioreactor provides a locus for the accumulation of microbes. The porous nature of the support not only permits the accumulation of a relatively high biomass per unit volume of bioreactor but also aids in the retention of the biomass within each bioreactor.

As used herein, the term "microbe" (and derivations thereof) is meant to include any microorganism which degrades organic materials, e.g., utilizes organic materials as nutrients. This terminology, then, also includes microorganisms which utilize as nutrients one or more metabolites of one or more other microorganisms. Thus, the term "microbe," by way of illustration only, includes algae, bacteria, molds, and yeast, with bacteria being most preferred.

In general, the nature of the microbes present in each bioreactor is not critical. It is only necessary that the biomass in each bioreactor be selected to achieve the desired results. Thus, such biomass can consist of a single microbe species or several species, which species can be known or unknown (unidentified). Furthermore, the biomass in each bioreactor need not be strictly aerobic or strictly anaerobic, provided that the primary functions of the two bioreactors are consistent with their designations as hydrolytic-redox and anaerobic bioreactors, respectively. The term "primary function" as used herein means that at least 85 percent of the biomass in each bioreactor functions in accordance with the reactor designation.

Stated differently, the demarcation line or zone between a hydrolytic-redox function and an anaerobic function is critical. For high concentrations of carbon compounds, it may be controlled by recycling and removal of $CO_2$ in the hydrolytic-redox stage.

As used herein, the term "hydrolytic-redox" refers to the function of the first bioreactor which is to break down any macromolecules present into smaller units, e.g. monomers and oligomers, by hydrolysis and oxidation-reduction reactions. In doing so, the first bioreactor also serves to deplete the aqueous medium of dissolved oxygen.

It should be apparent, therefore, that the first bioreactor is not an aerobic bioreactor as the term "aerobic" is used in the prior art. The aqueous medium is not aerated continuously or even saturated with air or oxygen. Because residual oxygen in the medium is depleted, however, at least some oxidation-reduction occurs aerobically. The aqueous stream to be processed is delivered from the top of the hydrolytic-redox stage downward such that it is counter to the flow of gas which allows the separation of excess carbon dioxide at the top of the stage, thus removing the inhibitory effect of that gas upon the acid-formers. That excess carbon dioxide may then be delivered to the anaerobic stage for reduction to methane.

Examples of microbes which can be employed in the hydrolytic-redox bioreactor include, among others, strict aerobic bacteria such as *Pseudomonas fluorescens, Acinetobacter calcoaceticus,* and the like; facultative anaerobic bacteria such as *Escherichia coli, Bacillus subtilis, Streptococcus faecalis, Staphylococcus aureus, Salmonella typhimurium, Klebsiella pneumoniae, Enterobacter cloacae, Proteus vulgaris,* and the like; anaerobic bacteria such as *Clostridium butyricum, Bacteroides frazilis, Fuso-* bacterium necrophorum, Leptotrichia buccalis, Veillonella parvula, Methanobacterium formicicum, Methanococcus mazei, Methanosarcina barkeri, Peptococcus anaerobius, Sarcina ventriculi, and the like; molds such as Trichoderma veride, Aspergillus nicer, and the like; and yeasts such as Saccaromyces cerevisiae, Saccharomyces elliosoideus, and the like. Obviously, the hydrolytic-redox bioreactor should not contain either strict aerobes or strict anaerobes only.

Examples of microbes which can be utilized in the anaerobic bioreactor include, among others, facultative anaerobic bacteria, anaerobic bacteria, and yeasts such as those listed above. Of course, the anaerobic bioreactor should not contain strict aerobes only, although the presence of such microbes usually is not harmful.

As already pointed out, the microbes employed in each bioreactor are selected on the basis of the results desired. If a particular product is not required, the choice of microbes can be made on the basis of waste conversion efficiency, operating parameters such as temperature, flow rate, and the like, microbe availability, microbe stability, or the like. If, on the other hand, a particular product is desired, the microbes typically are selected to maximize production of that product. By way of illustration only, the table below indicates some suitable combinations of microbes which will yield the indicated product.

TABLE I

| Hydrolytic-Redox Bioreactor | Anaerobic Bioreactor | Product |
| --- | --- | --- |
| Acetobacter aceti | Methanobacterium soehngenii | Methane |
| Acetobacter peroxydans | Methanobacterium formicicum | Methane |
| Acetobacter pasteurianus | Methanococcus mazei | Methane |
| Propionibacterium acidi-propionici | Methanobacterium thermoautrophicum | Methane |
| Bacillus macerans | Methanobacterium ruminantium | Methane |
| Bacillus acetoethylicus | Methanobacterium mobile | Methane |
| Erwinia dissolvens | Methanosarcina methanica | Methane |
| Escherichia coli | Methanosarcina barkeri | Methane |
| Klebsiella pneumoniae | Methanococcus mazei | Methane |
| Trichoderma viride | Methanococcus vanneielli | Methane |
| Asprigillus niger | Propionibacterium acidi-propionici | Methane |
| Saccharomyces cerevisiae | Saccharomyces cerivisiae | Ethanol |
| Saccharomyces ellipsoideius | Saccharomyces ellipsoideius | Ethanol |
| Aspergillus niger | Clostridium propionicum | Propanol |
| Trichoderma viride | Clostridium saccharoacetoper-butylicum | Butanol |
| Escherichia coli | Clostridium butyricum | Hydrogen |

In general, the microbes are introduced into each bioreactor in accordance with conventional procedures. For example, the bioreactor can be seeded with the desired microbes, typically by circulating an aqueous microbial suspension through the bioreactor. Alternatively, the microbes can be added to the waste stream at any desired point. In cases where the waste stream already contains the appropriate types of microbes, the passage of such waste through two bioreactors will in due course establish the requisite microbe colonies therein. Of course, the bioreactors can be assembled using porous supports having microbes immobilized thereon.

The second bioreactor optionally contains controlled-pore, hydrophobic organic membranes. As used herein, the terms "membranes" refers to either continuous formed articles, or noncontinuous, the shape and dimensions of which are adapted to process requirements. Thus, the membranes can be flat or curved sheets, a three-dimensional article such as a rectangular or cylindrical tube, or a complex monolith having alternating channels for gas and aqueous medium. As a practical matter, the membranes most often will consist of two porous sheets to provide passage of aqueous medium between them. Gas diffusion occurs with carbon dioxide being delivered through the lower sheet and methane being removed through the upper sheet. Wall thickness is not critical, but must be sufficient to permit the membrane to withstand process conditions without deformation or breakage. In general, a wall thickness of at least about 1.0 mm is desired.

The membrane can be hydrophobic porous polyethylene, polypropylene or fluorocarbon.

The membrane must have a controlled porosity such that at least about 90 percent of the pores have diameters of from about 100 Å to about 10,000 Å. Preferably, the pore diameter range will be from about 900 Å to about 9,000 Å, and most preferably from about 1,500 Å to about 6,000 Å.

It also should be apparent to one having ordinary skill in the art that the configurations of the two bioreactors are not critical to the processing method of the present invention. Thus, the present invention comprehends any configuration which is not inconsistent with the instant disclosure. Most often, the hydrolytic-redox bioreactor will be a conventional cylindrical or tubular reactor with down-flow delivery and a recycle mode; while the anaerobic bioreactor is preferably a flat-bed type. Each bioreactor contains the porous support. Typically, such reactor is composed of any suitable material which is impervious to both gases and liquids. Suitable materials include, among others, glass, stainless steel, glass-coated steel, poly(tetrafluoroethylene), and the like. Each bioreactor optionally is jacketed. The jacket, if present, can be constructed from any of the usual materials, such as those listed for the bioreactors.

In the case of the second bioreactor, it optionally comprises the controlled-pore, hydrophobic organic membrane. This bioreactor still can be, and preferably is, jacketed, especially when it is either necessary or desirable to contain, isolate, analyze, utilize, or otherwise handle gaseous products evolved during the processing method of the present invention.

In more general terms, each bioreactor normally will be shaped in such manner as to provide one or more channels for the passage of fluid. Where multiple channels are provided, such channels can provide independent flow of the fluid through such channels or they can be serially connected. The aqueous medium can flow through such channels or around such channels. Thus, the porous support can be constructed to form such channels or located around such channels. For example, given the cylindrical bioreactor already described, the porous support can be obtained in the form of a cylinder or tube. Hence, the aqueous medium can flow either through or around the cylinder or tube.

When the organic membrane is used in the second bioreactor, gaseous products or reactants will pass from or through the membrane. When the membrane is not used, gaseous products simply pass from the bioreactor liquid phase to a vapor or gas phase.

Gaseous product removal, of course, is readily achieved by the various means known to those having ordinary skill in the art. Typically, the gaseous products are simply pumped away from the second bioreactor. In other words, the gas space of the second bioreactor is connected to a gas collection means that is maintained at a pressure which is less than that of the second reactor.

While process temperatures are critical only to the extent that the microbes present in each reactor remain viable, as a practical matter the process of the present invention will be carried out at a temperature of from about 10° C. to about 60° C. The first reactor preferably is maintained at an elevated temperature, i.e., a temperature above ambient temperature. The preferred temperature range for the first reactor under such circumstances is from about 30° C. to about 40° C., while the second reactor is maintained at a lower temperature, preferably about 10° C. lower.

It will be appreciated that the invention is not limited to the specific details shown in the illustrations and that various modifications may be made within the ordinary skill in the art without departing from the spirit and scope of the invention.

I claim:

1. An improved method of treating biodegradable organic material suspended or dissolved in an aqueous medium to produce methane gas, said method comprising the steps of:
   (a) flowing the suspended or dissolved biodegradable material under pressure through a hydrolytic-redox, immobilized microbe first bioreactor containing a porous support immobilized high biomass having an upper and a lower portion, whereby a first reaction product is formed and gaseous carbon dioxide is evolved, said flowing of the biodegradable material being in a downward direction from the upper portion of the first bioreactor through the lower portion, counter to the flow of the gaseous carbon dioxide rising from the lower portion through the upper portion,
   (b) then continuing the flow of the first reactor product from the lower portion of the first bioreactor through an anaerobic, immobilized microbe second bioreactor wherein methane gas is evolved,
   (c) removing the evolved carbon dioxide from the upper portion of the first bioreactor and delivering the carbon dioxide to the second bioreactor, whereby carbon dioxide gas is removed from the first bioreactor, where accumulation of carbon dioxide is detrimental, and is added to the second bioreactor, where carbon dioxide is utilized, and
   (d) collecting the methane gas from the second bioreactor.

2. The method of claim 1 wherein the suspended or dissolved biodegradable organic material flows from the upper portion of the first bioreactor to the lower portion thereof and a portion of the organic material is recycled from said lower portion to said upper portion.

3. The method of claim 1, wherein the microbes of both reactors are immobilized on a porous, high surface area, recalcitrant support.

4. The method of claim 3, wherein the microbes of the hydrolytic-redox bioreactor are facultative microbes.

5. The method of claim 4, wherein the microbes of the anaerobic bioreactor are Methanobacter.

6. The method of claim 5, wherein the support of at least one of the bioreactors is an inorganic material.

7. The method of claim 6, wherein the inorganic material is a metal oxide.

8. The method of claim 7, wherein the metal oxide is siliceous.

9. The method of claim 7, wherein the metal oxide is alumina.

10. The method of claim 5, wherein the support of at least one of the bioreactors is a hydrophobic recalcitrant organic polymer having a hydrophilic surface.

11. The method of claim 10, wherein the organic polymer is selected from the group consisting of polyethylene, polypropylene and fluorocarbon polymers.

12. The method of claim 11, wherein the fluorocarbon polymers is polyvinylideneifluoride fluorocarbon.

13. The method of claim 5, wherein the methane is collected intermittently.

14. The method of claim 13, wherein the methane is collected at a pressure below that of the anaerobic bioreactor.

15. The method of claim 1, wherein the pH conditions of both bioreactors are adjusted to optimize the production of the products.

16. The method of claim 1, additionally including the step of removing the effluents from the anaerobic bioreactor.

17. The method of claim 1, wherein the temperature in each of the bioreactors is between about 10° C. and about 60° C.

* * * * *